United States Patent [19]
Garavelli

[11] 3,724,234
[45] Apr. 3, 1973

[54] ICE CREAM MAKING MACHINE
[75] Inventor: Giancarlo Garavelli, Milan, Italy
[73] Assignee: Heron Establishment, Vaduz, Liechtenstein
[22] Filed: June 24, 1970
[21] Appl. No.: 49,450

[30] Foreign Application Priority Data
  July 2, 1969    Switzerland.....................10114/69

[52] U.S. Cl.....................62/308, 222/4, 261/DIG. 7, 261/121 R
[51] Int. Cl...............................................F25c 7/14
[58] Field of Search .261/76, 78 A, 12 R, 19, DIG. 7; 62/69, 70, 306, 307, 308, 392, 294; 16/2; 222/4, 400, 7, 464

[56] References Cited
UNITED STATES PATENTS

| | | |
|---|---|---|
| 1,248,705 | 12/1917 | Pogue......................................62/294 |
| 1,991,264 | 2/1935 | Thomas et al. ..................261/DIG. 7 |
| 2,241,426 | 5/1941 | Sherwood...........................62/306 X |
| 2,654,585 | 10/1953 | Heesen...................................261/19 |
| 2,541,709 | 2/1951 | Marx......................................62/306 |
| 2,834,190 | 5/1958 | Andrews et al....................62/392 X |
| 2,996,567 | 8/1961 | Channell et al.........................16/2 X |
| 3,209,554 | 10/1965 | MacManus............................62/306 |
| 3,365,910 | 1/1968 | Grose ..................................62/69 X |
| 3,533,537 | 10/1970 | Hazlewood..........................62/69 X |

Primary Examiner—William E. Wayner
Attorney—Kimmel, Crowell & Weaver

[57] ABSTRACT

An ice cream making machine using disposable air tight containers for the mix, the container being placed under pressure by compressed gas, which thus causes the liquid to mix with the gas, the combination taking place at a molecular level, and which also causes the emulsion thus formed to be conveyed to the ice cream distributor.

7 Claims, 11 Drawing Figures

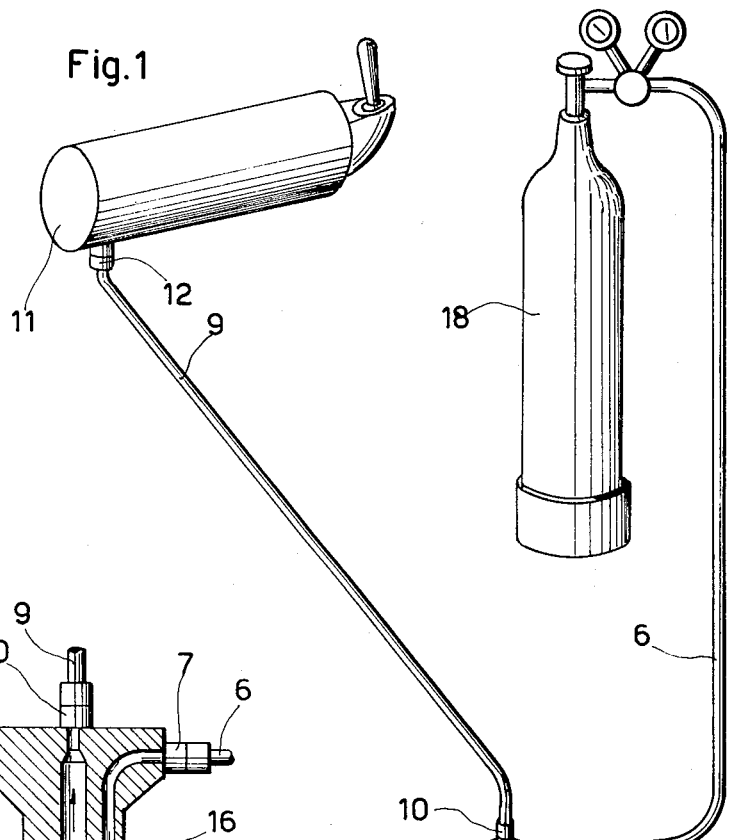
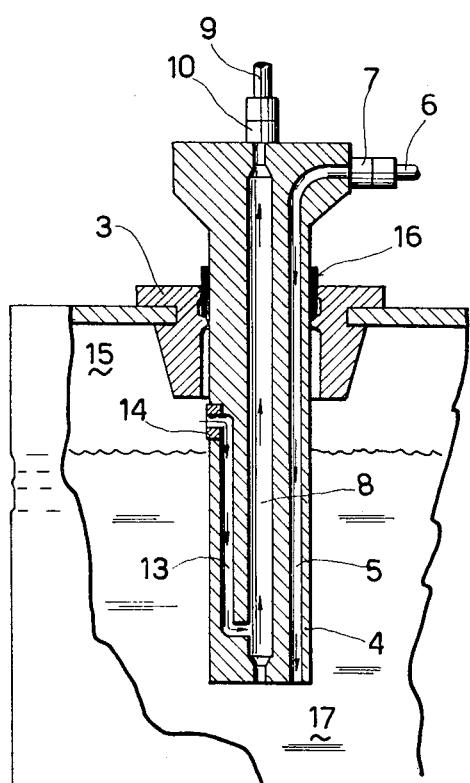
Fig. 1
Fig. 2

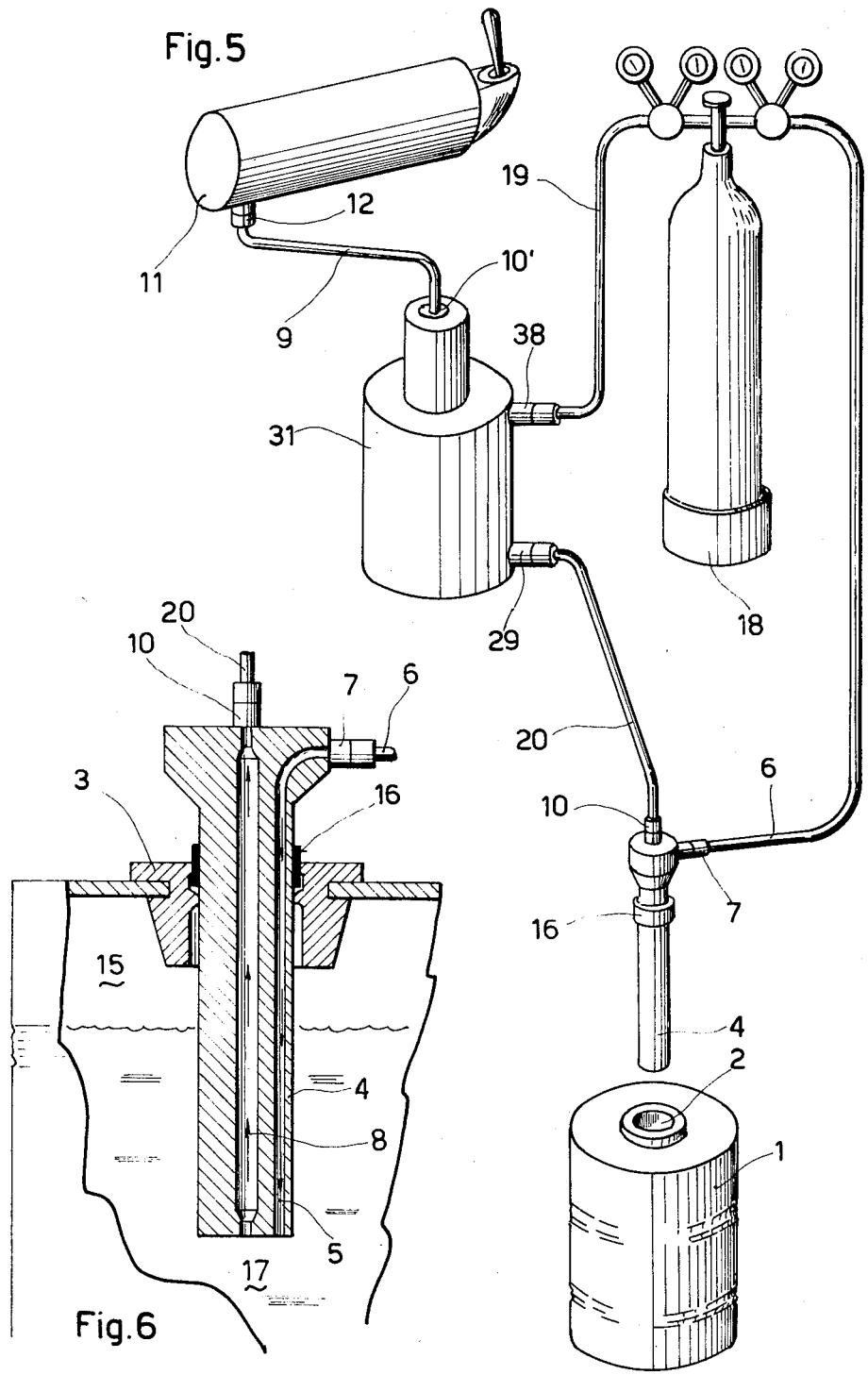

ICE CREAM MAKING MACHINE

DESCRIPTION OF THE PRIOR ART

For the preparation of ice cream of the sherbet and soft ice types, it is customary to use machines in which a water based mixture of fatty substances and flavored essences (called a "mix") is emulsified with air. The mixture is conveyed to the ice cream making machine by means of a pump which has the combined function of drawing the mix from an open-topped container, of conveying it to the mixer-distributor, of forming the emulsion, and of maintaining the pressure in the ice cream maker.

In order to obtain the proper combination of air and liquid mix, the pump is usually made powerful enough for its effect to extend beyond the end of the feed line. This results in outside air being sucked in at the same time as the mix. The action of the mixer causes the air to be combined with the mix, and then, in the form of an emulsion, the two are cooled in the freezer.

The addition of air gives the mix, once it has been emulsified and frozen, a soft, pasty appearance, and it is of greater volume than the original mix (the ratio between the volume of the original mix and that of the ice cream product is known as the "overrun").

Such an arrangement has a number of drawbacks. First, the liquid mix is easily contaminated by bacteria from the outside air, and this represents a considerable health risk. Second, frothing is liable to occur in the container, thereby causing unrecoverable loss of the original mix. Third, the operations of cleaning the pump and the container are difficult to carry out, and frequently require that they be taken to pieces, if only in part. Fourth, the mechanism of the device is complicated and has to be manufactured to very precise standards, thereby increasing the cost of the machine and, ultimately, of the ice cream. Fifth, the overrun is small, as it is a function of the power of the pump, and this is necessarily somewhat limited. And, finally, the value of the overrun is not constant, as it is linked to the viscosity of the mix, which is variable.

As a result of the above, it has been found difficult to produce ice cream economically and uniformly. Probably the major drawback lies in the fact that when air is added to the mix by dynamic means, it does not combine properly with the mix and does not form a truly stable emulsion. This makes it im-possible to obtain a consistently high quality of really soft ice cream.

SUMMARY OF THE INVENTION

The present invention seeks to eliminate the aforementioned drawbacks.

According to the present invention, the ice cream making machine comprises an ice cream mixer-distributor, an emulsifier, a separate air-tight container for the liquid mix, a source of gas under pressure and a central core which is placed inside the container when the container is in use. The central core includes two tubes which open at their lower extremities into the container. One of the tubes is linked to the source of gas under pressure, and the other to the mixer-distributor. The emulsifier may form part of the central core, to be inserted into the disposable container at the same time as the core, or it may be placed outside the container, between the central core and the mixer-distributor.

Means may be provided to compensate for the internal pressure in the container. The machine may also comprise a refrigerating compartment in which to place the said containers.

With the machine according to the present invention, a stable emulsion can be obtained, in which the gas combines with the mix at a molecular level and the overrun obtained is of a high value.

The gas employed is preferably either nitrogen or carbon dioxide, as no bacteria can survive in these gases. The ice cream that is produced with these gases is therefore free from all bacteria, as there is no possibility of the ice cream being contaminated in the circuit of the ice cream making machine.

A further advantage of the machine according to the present invention lies in the fact that it can be used to prepare industrial quantities of the sherbet and soft ice types of ice cream from a mixture of syrup, flavored essences and water, without needing the adjunction of fatty substances. This cannot usually be achieved with conventional machines, because the air that is added to the mix in conventional machines can be retained only by the presence of fatty substances.

A further advantage of the instant machine lies in the fact that the separate containers which hold the liquid mix can easily be manufactured at the same place as where they are filled, are always ready for use, can be sterilized or pastuerized if necessary, and can be thrown away after use.

The machine according to the present invention is illustrated schematically and described by way of example only, in different embodiments, with reference to the attached drawings.

BRIEF DESCRIPTION OF THE DRAWINGS

FIG. 1 is a perspective view of a first possible embodiment of the machine according to the present invention;

FIG. 2 is a cross-sectional view of the central core of the machine illustrated in FIG. 1;

FIG. 5 is a perspective view of a second embodiment of the machine according to the present invention;

FIG. 6 is a cross-section of the central core of the machine illustrated in FIG. 5;

DESCRIPTION OF THE PREFERRED EMBODIMENTS

Figure 3:
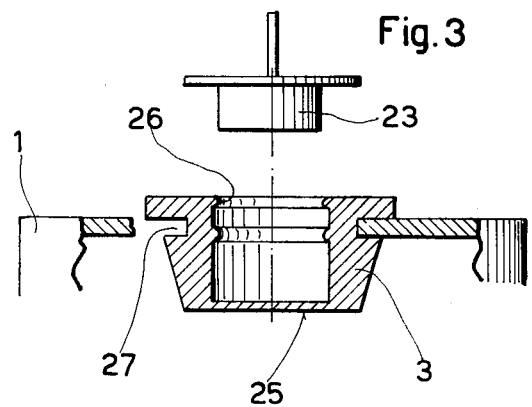
FIG. 3 is a cross-sectional view of the stopper of the container used in conjunction with the machine, with the container closed, before use.
Figure 4:
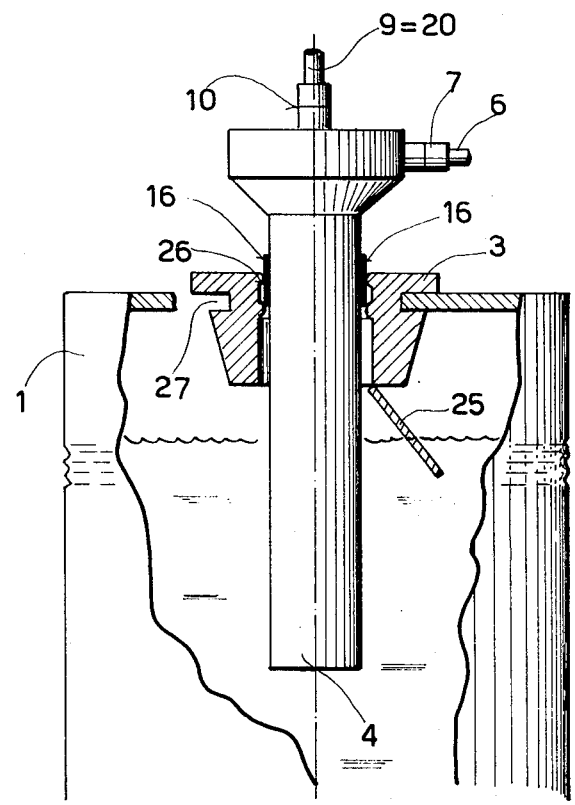
FIG. 4 is the same when the container is in use (open)

Referring now to the drawings in detail, wherein like reference numbers indicate like parts throughout the several figures, it will be seen that the ice cream making machine uses a separate, air tight, disposable container 1 to hold the mix 17, the container 1 being linked, on the one hand, to a source of gas under pressure 18 and on the other hand to a freezer mixer-distributor 11 (shown schematically). Power means (not shown) are provided for driving the mixer and refrigerating means (not shown) are provided for cooling the distributor. The container 1 has only one opening 2, which can be sealed by means of a collar 3 (see FIGS. 3 and 4).

The container 1 has a circular opening 2 in the top thereof which is fitted with a circular, cone-shaped collar 3 (see FIGS. 3 and 4) having a horizontal circular groove 27 integrally formed on the outside thereof for clamping engagement with the peripheral edge of the opening in the top of the container. Inwardly extending ribs 26 are formed on the inner wall of the collar for cooperation with seal 16 on core 4 to ensure that the container is air tight after the core has been inserted. A thin membrane 25 is provided at the bottom of collar 3, which will keep the container sealed until it is pierced by insertion of the core 4 into the container. A safety cap or stopper 23 is also provided for insertion into the top of the collar 3 to keep dirt and other foreign material out until the container is ready to be used.

In the first embodiment (see FIGS. 1 and 2), the container 1 is brought into service by inserting the vertical central core 4 through the opening 2 at the top of the container 1 so that the bottom of the core 4 is immersed in the mix 17 in the container 1. The central core 4 includes three vertical passages (5, 8 and 13, respectively). Inlet passage 5, which is used for feeding pressurized gas into container 1, has the upper end thereof connected to a feed line 6 by means of a valve 7. The lower end of the passage 5 opens into the container 1 at the bottom of the core 4 by intersecting the core periphery at the bottom of the core below the top of the mix 17. The gas entering the containers will mix with the liquid mix 17. The second passage 8, which is used to discharge a gas-liquid emulsion from container 1, has the upper end thereof connected to an outlet line 9 by means of a valve 10. The lower end of the second passage 8 opens into the container 1 at the bottom of core 4 by intersecting the core periphery at the bottom of the core below the top of the mix 17. The liquid mix 17 with gas therein will pass upwardly therethrough. The third passage 13 is provided with a calibrated aperture 14 at its upper end which intersects the core periphery above the intersections of the passages 5 and 8 with the core periphery and above the top of the mix 17 and which opens into the air space between the top of the mix 17 and the top of container 1. The bottom of the third passage 13 connects with the second or outlet passage 8 near the bottom thereof. Gas from the air space above the mix will pass through calibrated opening 14, third passage 13 and into second passage 8. Passage of the gas into second passage 8 will cause the liquid mix 17 being forced upwardly through the bottom of the second passage to be further enriched with gas for complete emulsification.

Figure 8:
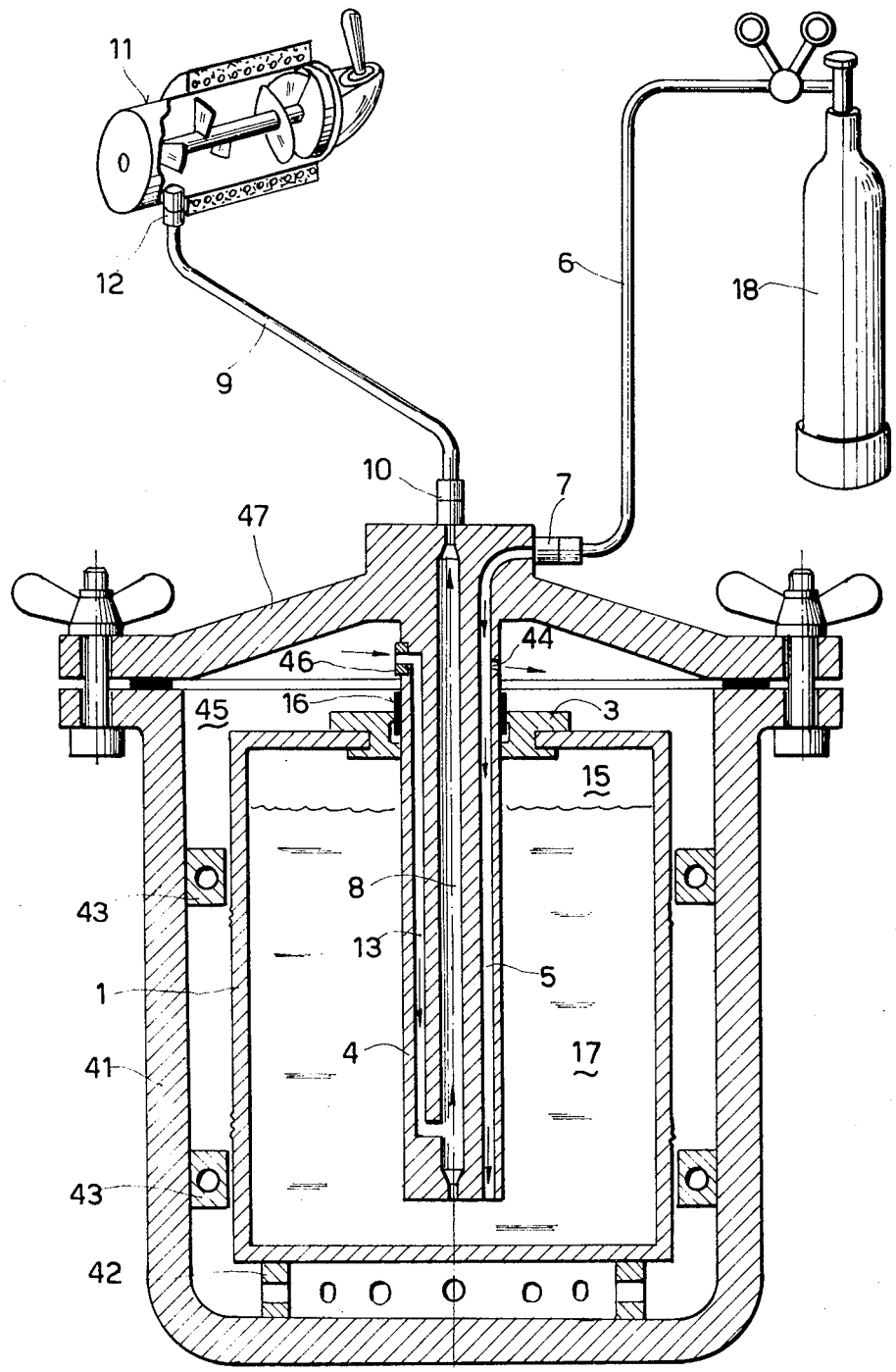
FIG. 8 is a perspective view and partial cross-sectional view of another embodiment of the machine according to the present invention.

In a second possible embodiment (see FIG. 8), the container 1 is brought into service by being placed inside a secondary container 41 of similar shape which is so constructed that the original container 1 is maintained within it by a support ring 42 at the bottom and by protruding elements 43 disposed on the inner wall of the secondary container 41. In this embodiment of the invention, the inlet passage 5 has an additional opening 44 which permits gas to pass into the air space 45 between the two containers (1 and 41, respectively); the third passage 13, which serves as an internal emulsifier, links the air space 45 with the bottom of the vertical outlet tube 8 by means of a calibrated aperture 46. In this embodiment, the central core 4 is firmly attached to the lid 47, and, by conventional means, the lid provides a hermetic seal for the container 41.

In the case of this particular design, the containers do not have to be made to withstand a high internal pressure, such as that caused by the gas under pressure, for the force is distributed equally and the container is subject to equal pressure on the inside and on the outside. Furthermore, this embodiment features two advantages. First, the air space 15 is reduced to a bare minimum, leaving just enough space to allow for the displacement of mix when the central core 4 is inserted, the calibrated aperture 14, which allowed gas to pass, being no longer needed inside of the container. Second, the compressed gas in the passage 13 comes from air space 45 through calibrated aperture 46 thus avoiding all possible chance of extra mix 17 instead of extra gas, being added to the emulsion.

Figure 9:
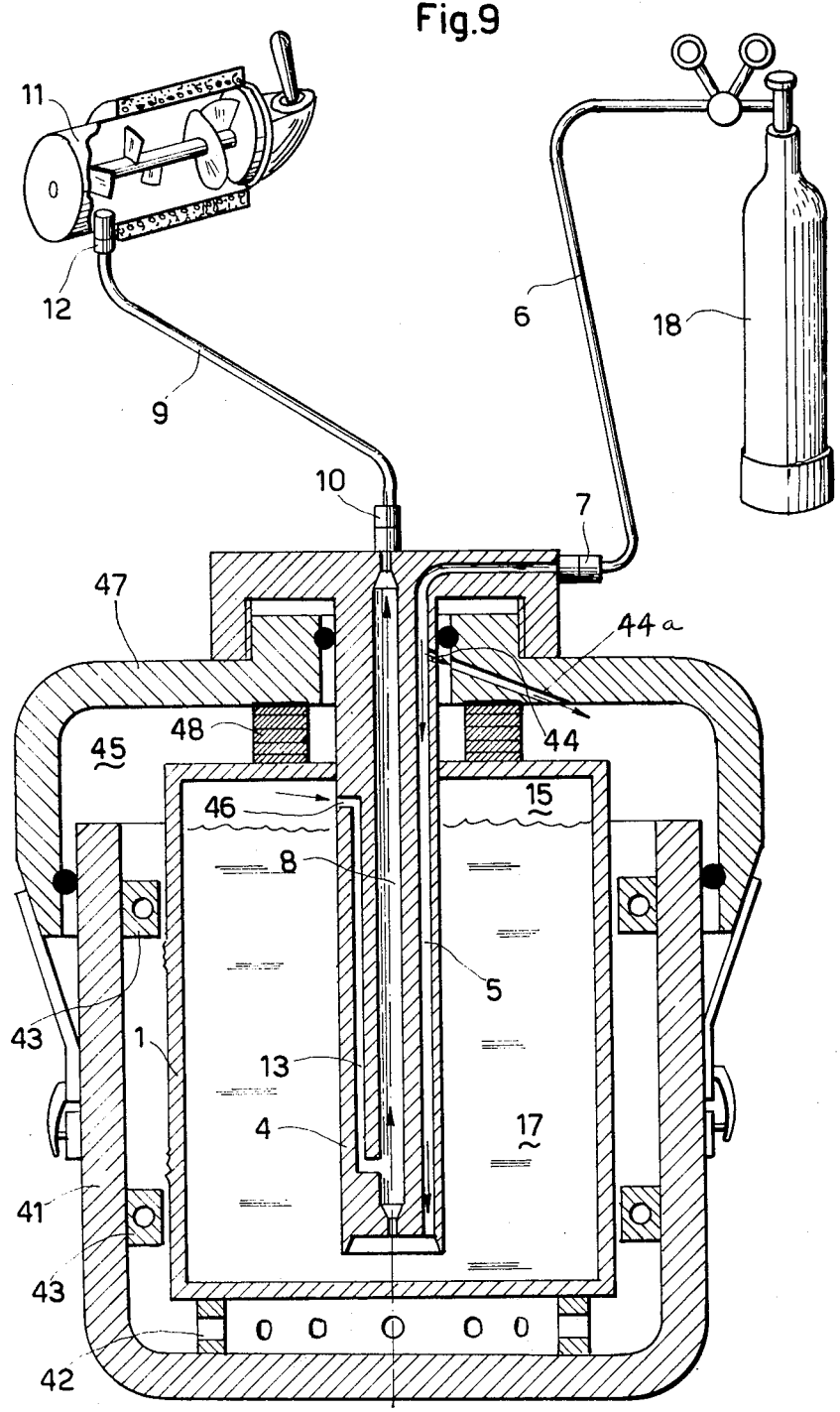
FIG. 9 is a modified form of the embodiment illustrated in FIG. 8.

If desired, the container need not be manufactured specially. It may be of conventional design, e.g. of the type already in general use in the food industry, whereby a special collar will not be required to allow passage of the central core 4. In this case (see FIG. 9) the container 1 is placed within an air tight container 41, the lid 47 of which has an opening in the center for the central core 4 to pass through. A circular hermetic seal 48, attached round the opening in the lid 47, is placed between the lid 47 and the upper face of the container 1. In this way, the air space 45 between the container 1 and the other, secondary container 41 is isolated from the circumambient air.

The central core is screwed to the lid, but it could be manufactured as in integral part thereof. The central core 4 has a sharp, circular end on its bottom which will pierce the top of the container 1 when the core 4 is introduced through the opening in the middle of the lid 47 and the core 4 is rotated to attach it to the lid 47. A calibrated aperture 46 is provided and this opens into the air space 15 between the mix and the top of the container. This avoids possible risk of contamination of the mix 17 by polluted air that may have been in the air space 45 of the secondary container 41. The inlet tube 5 has an opening 44 and the lid 47 has a passageway 44a which permit pressurized gas to flow for equalizing the pressure inside of and outside of container 1.

In another embodiment (see FIGS. 5, 6 and 7), the container 1 is brought into use by means of a simplified central core 4 which is introduced through the opening at the top of the container 1. This central core includes only the first or inlet passage 5 and the second or outlet passage 8. Passage 8 is connected to an outlet line 20 by means of a valve 10. Passage 5 is connected by valve 7 to an inlet line 6 leading from a source of gas pressure 18. The outlet line 20 is connected to a separate and independent, external emulsifier 31 by means of connecting valves 29. A feed line 19, connected to the source of gas under pressure 18, is connected to the emulsifier by valve 38.

Figure 7:
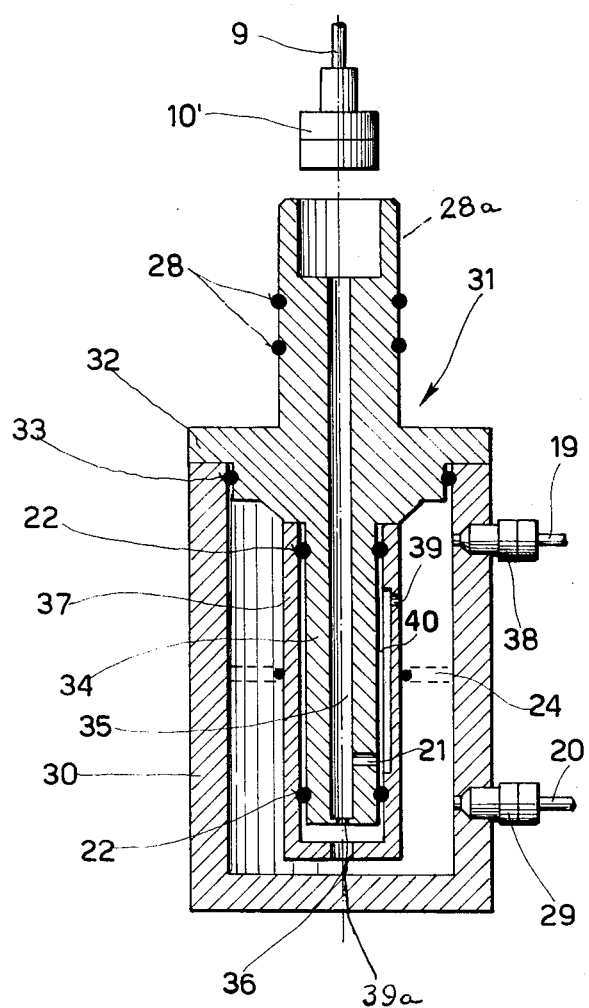
FIG. 7 is a cross-sectional view of the emulsifier of the machine illustrated in FIG. 5.

As will be seen from FIG. 7, the emulsifier 31 consists of a vertical, flat-bottomed, cylindrical container 30, with two valves in the side wall, the upper one 38 being for admission of the gas, and the lower 29 for admission of the liquid mix 17. A collared lid 32, having an air tight circular seal 33 is provided. The lid 32 has a collar member 28a formed integrally on its top, with circular sealing rings 28 being provided thereon. The lid 32 has on its underside an integral, downwardly extending cylindrical core 34. An internal passage 35 extends from the top of the collar 28a, through the lid 32 to the bottom of the core 34. The core 34 has an opening 36 at the bottom and a second opening 21 in the side, adjacent the bottom. The core 34 is surrounded by a cylinder 37 which has an opening 39 in its side near the top, an opening 39a in its bottom and a groove 40 leading from the level of the opening 39 to that of opening 21 in the core 34. Circular, horizontal seals 22 are placed between the core 34 and cylinder 37 above and below openings 21 and 39 to isolate the groove 40 from the rest of the space between the core 34 and the cylinder 37.

The emulsifier 31 may be linked directly to the ice cream mixer-distributor 11 through the collar 28a, which is kept air tight by its circular seals 28 or else it may be linked to the distributor by means of an outlet line 9 and a connecting valve 10', the outlet line 9 being connected to the ice cream mixer-distributor 11 by another connecting valve 12. The emulsifier 31 may have a circular, horizontal membrane 24 separating the liquid mix in the bottom of the container 30, from the pressurized gas in the upper half of the container, if desired.

In this embodiment gas under pressure enters container 1 through passage 5 and forces mix 17 out of the container through outlet line 20 to the emulsifier 31. Gas under pressure enters the emulsifier through line 19 passes through opening 39, groove 40 and opening 21 and thence upwardly through passage 35. When the gas flows upwardly into passage 35, the mix in the bottom of the emulsifier 31 will be drawn upwardly through opening 39a, through opening 39 and will be mixed or emulsified with the gas, after which the emulsion will pass through line 9 to the mixer-distributor 11.

Figure 10:
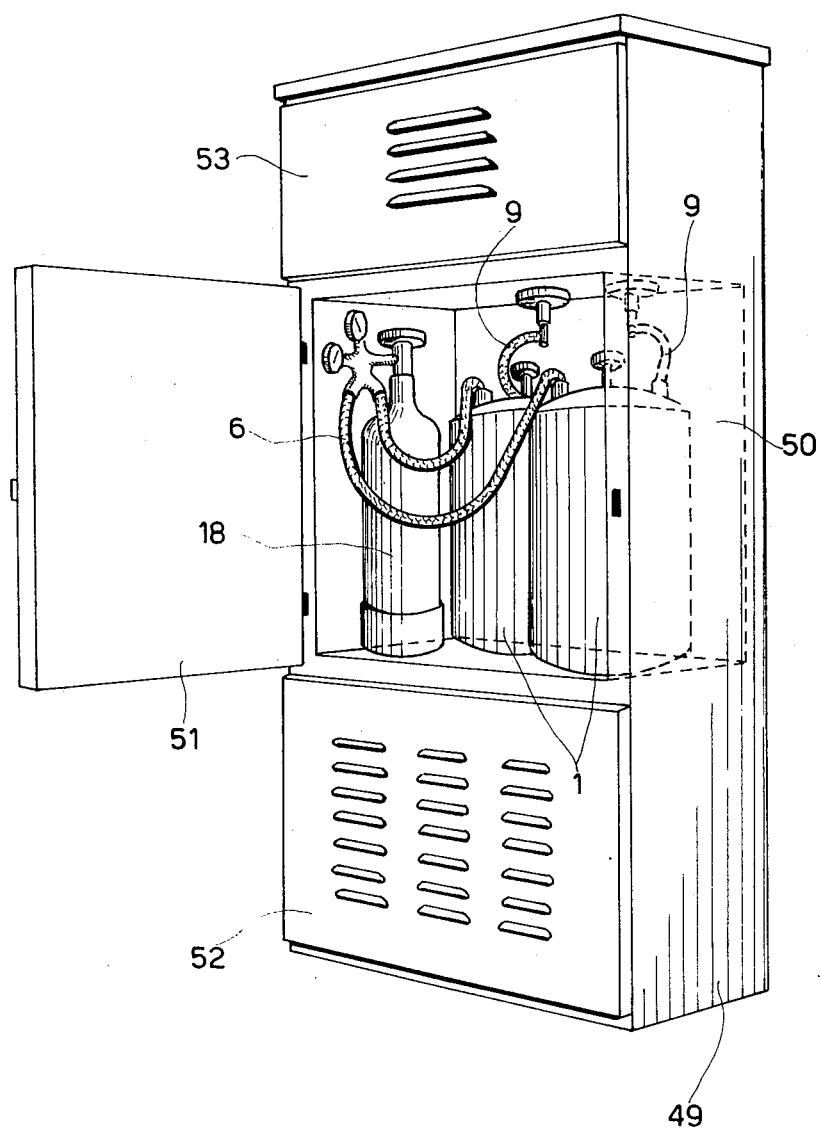
FIGS. 10 and 11 are perspective views of an embodiment of the present invention including a refrigerating cabinet.
Figure 11:
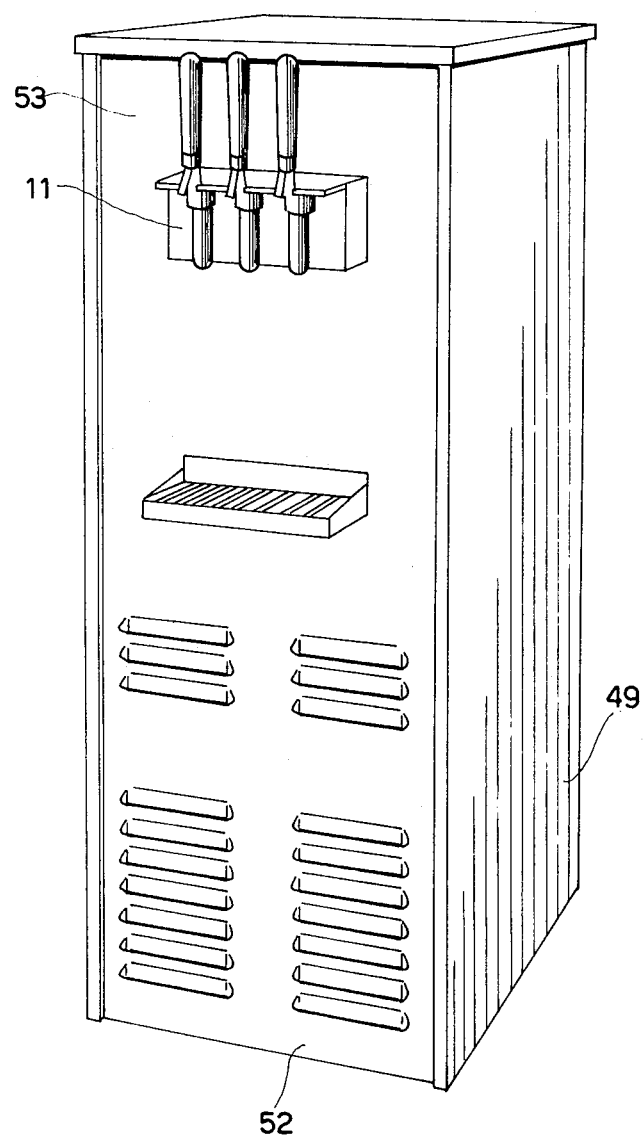

For use outside, and for use in shops, tea rooms and other warm buildings, the machine according to the present invention (see FIGS. 10 and 11) may include a cabinet having a refrigerating compartment 50 fitted with a door 51; a compressor compartment in the lower half 52 of the cabinet for housing the compressor required to lower the temperature in the refrigerating compartment 50 and in the mixer-distributor 11 and a freezer compartment in the upper half 53 of the machine for housing the mixer-distributor 11. Containers 1 are placed in the refrigerating compartment 50 and are linked to the mixer-distributor 11 by outlet tubes 9, their supply of gas under pressure being provided by a cylinder 18 of compressed gas, to which they are connected by feed lines 6.

The containers 1 can be disconnected from the gas pressure source 18 and from the mixer-distributor 11 and from the emulsifier 31 if this is a separate unit, by means of the appropriate connecting valves, without there being any contact whatsoever between the liquid mix for making the ice cream and the outside, possibly polluted air, or any other foreign body. This represents a substantial step forward both from the commercial and from the technical points of view. It should furthermore be noted that when the bacteriologically pure gas is emulsified with the mix, the combination takes place at a molecular level, so that the water contained in the mix is caused to evaporate. This, in turn, ensures that the ice cream will be "dry" and of high quality.

What is claimed is:

1. A machine for making ice cream comprising: an ice cream mixer-distributor; a source of gas under pressure; a disposable air tight container for holding liquid ice cream mix; a core removably mounted to and extending downwardly into said container from its top, the bottom of the core being immersed in the mix; a first passage in the core intersecting the core periphery below the top of the mix; means connecting said first passage with said source of gas for permitting the introduction of gas under pressure into the mix; a second passage in the core intersecting the core periphery below the top of the mix; means connecting the second passage with the mixer-distributor so as to enable the gas introduced into the mix by the first passage to convey the mix through the second passage to the mixer-distributor; and a third passage in the core intersecting the second passage at one end and intersecting the core periphery above the intersection of said first and second passages with the periphery of the core and above the top of the mix to thereby act as an emulsifier by mixing gas with the mix being conveyed through the second passage to the mixer-distributor.

2. A machine according to claim 1 wherein the third passage intersects the periphery of the core by way of an aperture within the container so as to link the air space in the container above the top of the mix with the second passage.

3. A machine according to claim 1 which includes means for compensating for internal pressure in the disposable container that comprises: a secondary container in which said disposable container is located so as to provide a space therebetween; a lid in air-tight relationship with the secondary container, said core being mounted to said lid and extending downwardly thereof through the top of said disposable container; and means providing communication between said first passage and said space.

4. A machine according to claim 1 further comprising: a sharp circular end on the bottom of said core whereby said bottom can cut an opening in said disposable container for insertion of said core therein.

5. A machine according to claim 3 wherein the lid of the secondary container has an opening therein for reception of the core.

6. A machine according to claim 5 further comprising: a circular air tight seal disposed between the core and the lid.

7. A machine according to claim 3 wherein said third passage intersects the core periphery in said space.

* * * * *